United States Patent [19]

Hayashi

[11] Patent Number: 5,122,824
[45] Date of Patent: Jun. 16, 1992

[54] CAMERA

[75] Inventor: Naohiko Hayashi, Kanagawa, Japan

[73] Assignee: Canon Kabushiki Kaisha, Tokyo, Japan

[21] Appl. No.: 612,620

[22] Filed: Nov. 13, 1990

[30] Foreign Application Priority Data

Nov. 17, 1989 [JP] Japan .................. 1-299223
Nov. 17, 1989 [JP] Japan .................. 1-299224

[51] Int. Cl.⁵ ............................................ G03B 17/38
[52] U.S. Cl. ............................................ 354/267.1
[58] Field of Search .......................... 354/266, 267.1

[56] References Cited

U.S. PATENT DOCUMENTS

4,707,127 11/1987 Goedken ...................... 354/266

Primary Examiner—Michael L. Gellner
Attorney, Agent, or Firm—Robin, Blecker, Daley & Driscoll

[57] ABSTRACT

A camera comprises an exposure device for making an exposure; a signal receiving circuit for receiving a remote-control signal; and a control circuit for a bulb exposure. The control circuit is arranged to cause the exposure device to begin the exposure in response to reception of the remote-control signal by the signal receiving circuit and, after that, to cause the exposure device to terminate the exposure in response to reception of another remote-control signal by the signal receiving circuit.

18 Claims, 7 Drawing Sheets

CAMERA

BACKGROUND OF THE INVENTION

1. Field of the Invention

This invention relates to a camera having the function of permitting a bulb exposure by remote control.

2. Description of the Related Art

Among the cameras of the kind permitting photographing by a remote operation, some of them are arranged to perform photographing by receiving a remote-control signal from a remote-control device. However, it is impossible to make a bulb exposure with these cameras. A bulb exposure by a remote operation, therefore, has been impossible without having recourse to a cable.

The bulb exposure by means of a cable, however, has presented the following problems: (1) The operability of the camera degrades and its bulkiness increases accordingly as the length of the cable increases. (2) Use of a long cable increases the possibility of wire breakage and thus lowers reliability. (3) A switch must be continuously pushed throughout the process of bulb exposure.

SUMMARY OF THE INVENTION

It is an object of this invention to provide a camera which is arranged to permit a bulb exposure by a remote operation without having recourse to any cable by the provision of a mode in which both the start and the end of the bulb exposure can be remotely controlled.

It is another object of the invention to provide a camera having a mode in which a remote-control signal is receivable during the process of exposure and another mode in which reception of a remote-control signal is not allowed during an exposure in such a way as to preclude the occurrence of such a problem that the exposure might be ended halfway by an erroneous remote-control operation.

It is a further object of the invention to provide a camera which permits a bulb exposure by a remote operation with excellent remote-control operability by using a timer which ensures that reception of a remote-control signal is never inhibited during an exposure under remote control.

These and further objects and features of the invention will become apparent from the following detailed description of embodiments thereof taken in connection with the accompanying drawings.

DETAILED DESCRIPTION OF THE PREFERRED EMBODIMENTS

Figure 1:
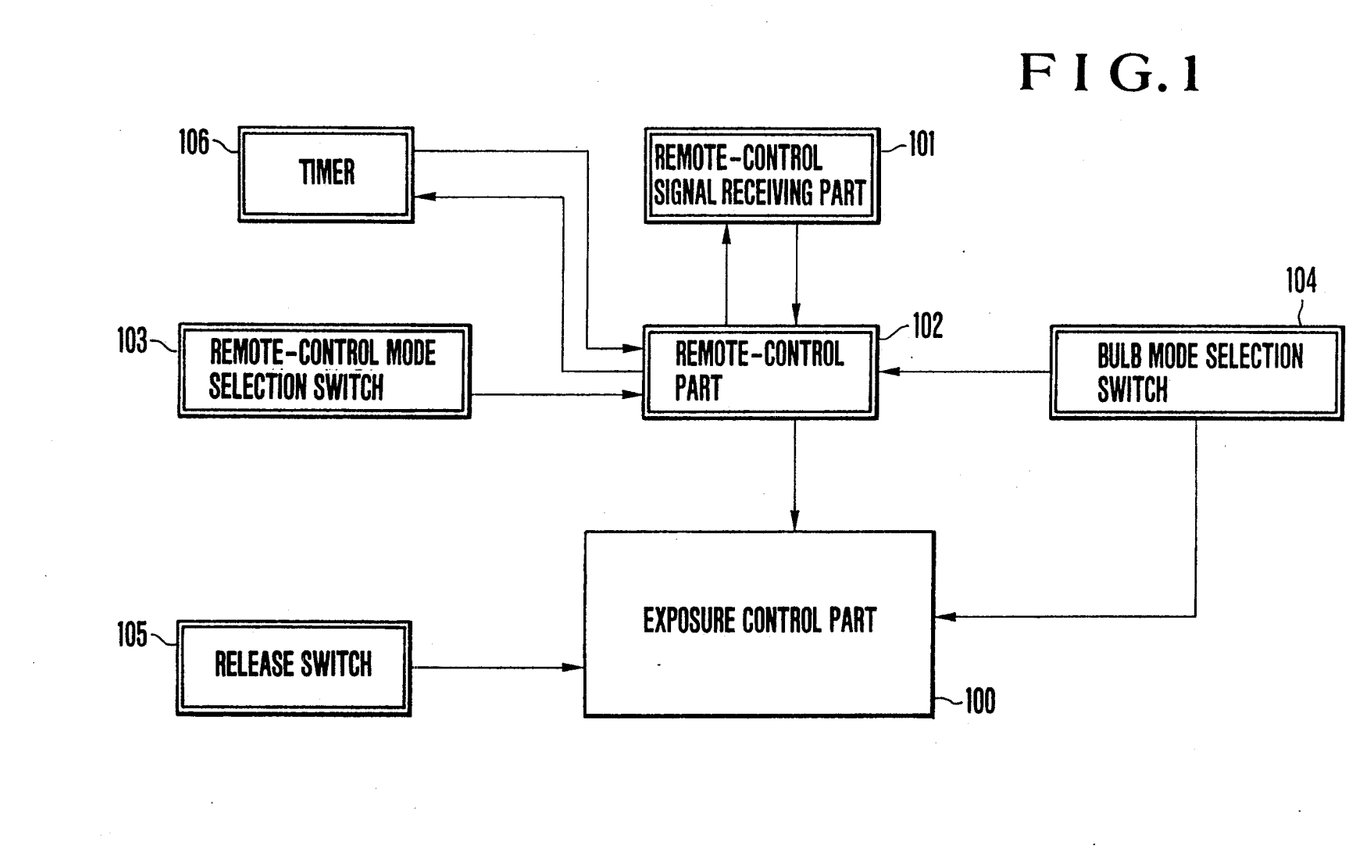
FIG. 1 is a block diagram showing the functions of a camera which is arranged as a first embodiment of this invention.

FIG. 1 shows in a block diagram the functions of a camera arranged according to this invention as a first embodiment thereof. When a remote-control mode is selected by a remote-control mode selection switch 103, a remote-control part 102 renders a remote-control signal receiving part 101 capable of receiving a remote-control signal. Then, an exposure control part 100 initiates an exposure action when a remote-control signal is received by the remote-control signal receiving part 101 or when a shutter release switch 105 is turned on. In this instance, if a bulb mode has been selected by a bulb mode selection switch 104, the camera remains in the exposure state until either another remote-control signal is received or the release switch 105 is turned off. A timer 106 is arranged to have its content renewed every time the remote-control mode is selected or every time shooting is made in the remote-control mode.

Figure 2:
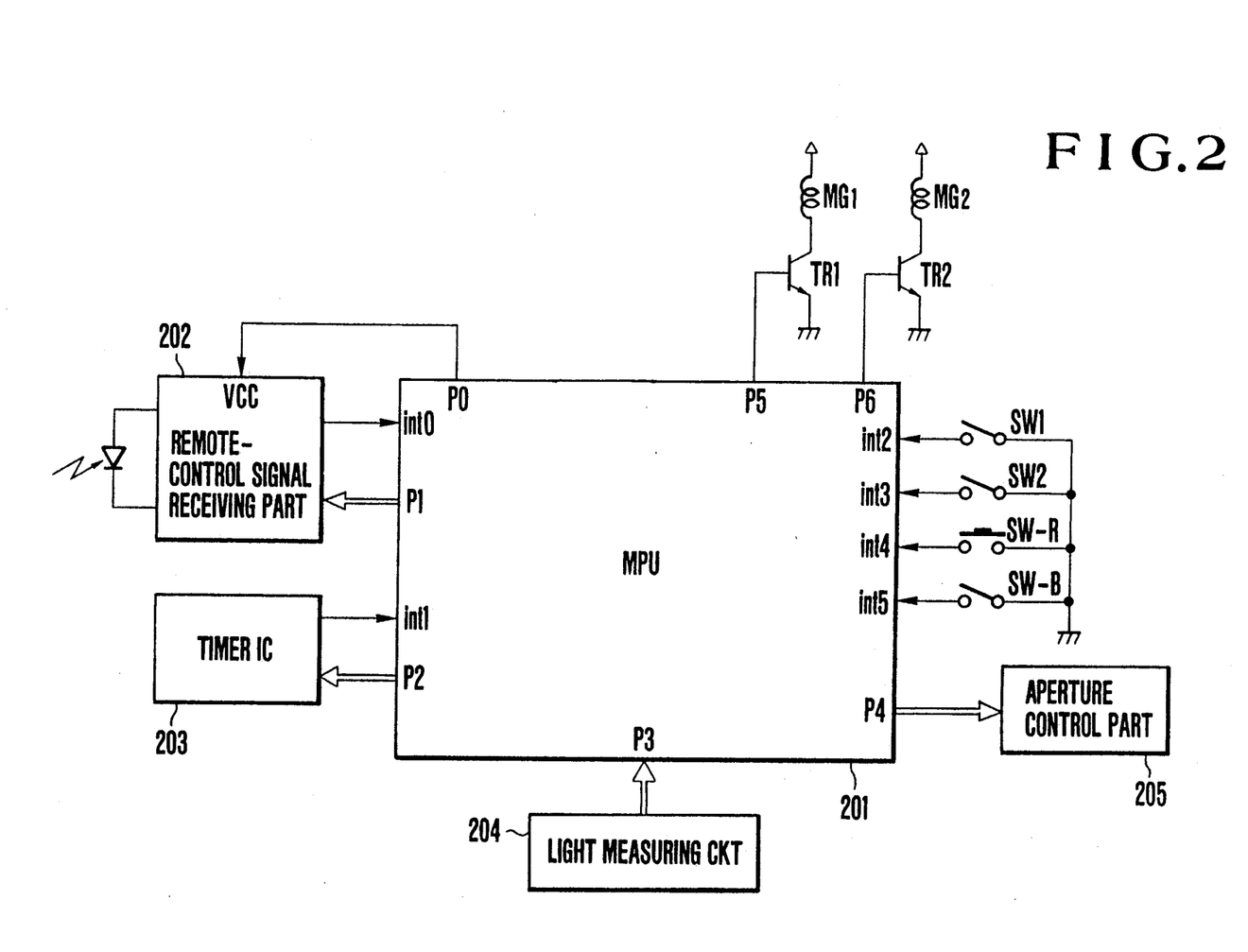
FIG. 2 is a circuit diagram showing the circuit arrangement of the first embodiment.

FIG. 2 shows the circuit arrangement of the camera of the first embodiment. In FIG. 2, a reference numeral 201 denotes a microcomputer (hereinafter referred to as MPU). The MPU 201 is arranged to control the whole camera. A remote-control signal receiving part 202 is arranged to become capable of receiving a remote-control signal when a remote-control-signal-receiving allowing signal is received from an output port P1 of the MPU 201 after power is supplied thereto from an output port P0 of the MPU 201. Then, when receiving the remote-control signal, the remote-control signal receiving part 202 supplies a signal "1" to an input port int0 of the MPU 201. When the MPU 201 reads this input, the output of the remote-control signal receiving part 202 becomes "0". In other words, after reception of a remote-control signal, the remote-control signal receiving part 202 continues to supply its output "1" to the input port int0 until the output is read by the MPU 201.

A timer IC 203 is arranged to begin a countdown action when receiving an arbitrary counting value from an output port P2 of the MPU 201. When the counted value becomes zero, the timer IC 203 produces an output "1" and supplies of the timer output to an input port int1 of the MPU 201. Then, reading it by the MPU 201 causes the timer IC 203 to produce an output "0". In other words, the timer IC 203 continues to supply the MPU 201 with the output "1" as a time-up signal until it is read by the MPU 201.

A light measuring circuit 204 is arranged to convert a measured analog value of the luminance of an object to be photographed into a digital value and to supply the measured digital luminance value to an input port P3 of the MPU 201. An aperture control part 205 is arranged to control the aperture of a diaphragm according to a value received from the MPU 201. Switches SW1 and SW2 are arranged to be turned on respectively by the first and second strokes of operation an a shutter release button which is not shown. A switch SW-R is arranged to effect change-over, every time it is turned on, between a remote-control mode in which a shutter release is effected in response to reception of a remote-control signal and a mode in which the remote-control signal is inhibited from being received. Another switch SW-B is arranged to turn on to select a bulb exposure mode in which the camera is kept in an exposure effecting state after a leading shutter curtain is allowed to travel. These switches SW1, SW2, SW-R and SW-B are connected respectively to the input ports int2, int3, int4 and int5 of the MPU 201.

The camera includes transistors TR1, TR2; output ports P5 and P6; a magnet MG1 which is arranged to allow the leading shutter curtain to travel when it is energized; and a magnetic MG2 which is arranged to allow a trailing shutter curtain to travel when it is energized.

The MPU 201 normally remains in a low power consuming state, which is called a standby state. While the MPU 201 is in the standby state, the states of its output ports and the contents of its RAM are kept unchanged. When in response to reception of a remote-control signal the state of the input port int0 is changed, or when the state of the input port int1 is changed as the counted value of the timer IC reaches zero, or when the state of any of the input ports int2 to int5 is changed by the respective one of the switches SW1, SW2, SW-R and SW-B, the MPU 201 comes out of the standby state to begin its processing operation.

Figure 3:
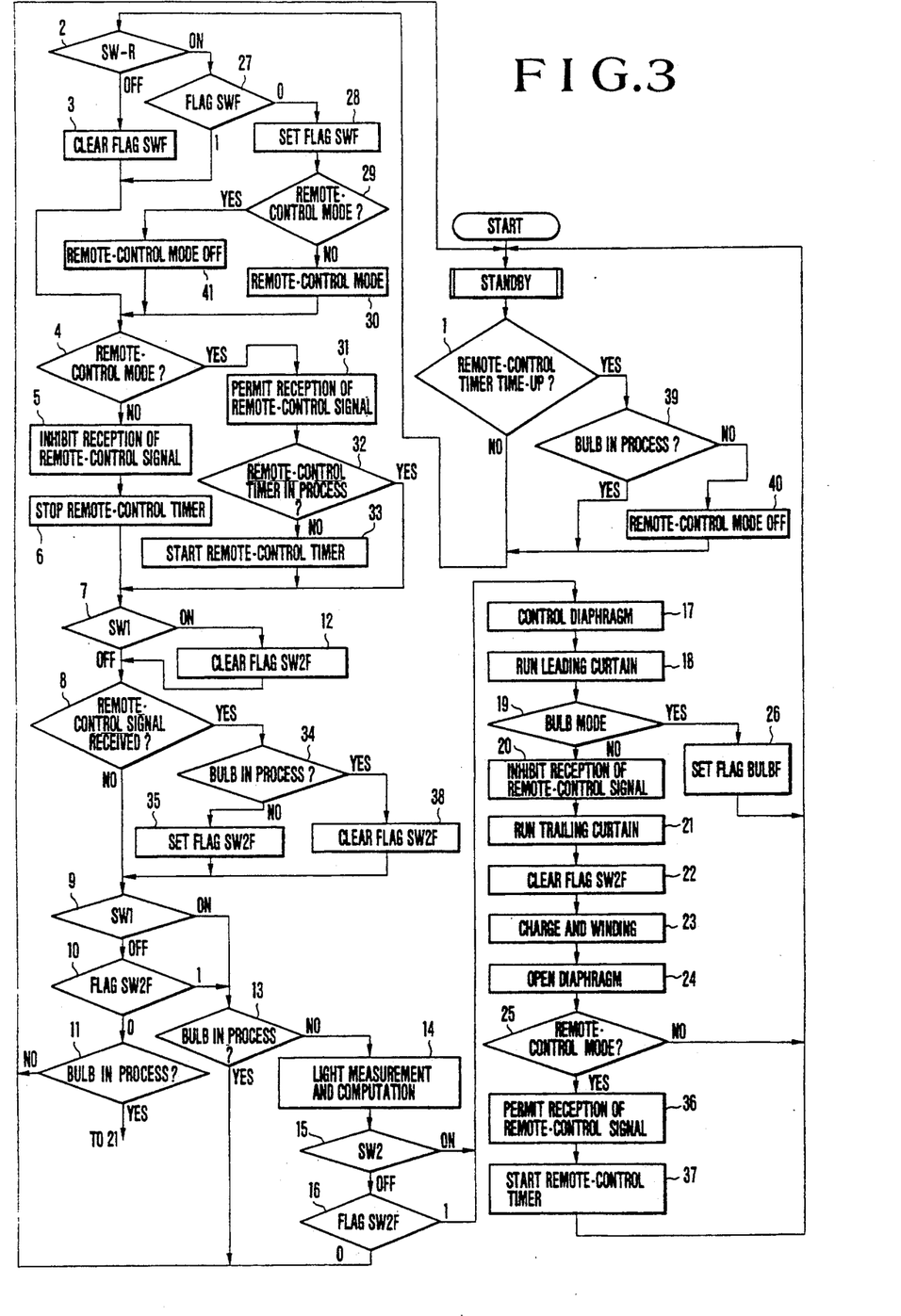
FIG. 3 is a flow chart showing the operation of the circuit of FIG. 2.

The operation of the circuit shown in FIG. 2 is described as follows with reference to FIG. 3 which is a flow chart: When power is supplied to the camera, the states of all the circuit elements are reset to bring the camera into a standby state. Under this condition, when the state of any of the input ports int0 to int5 changes, the camera comes out of a standby state to begin its operation from a step 1.

At the step 1: The timer IC 203 is checked to find if the time is up with the countdown by the timer having been completed. If the time is up, a signal "1" is supplied to the input port int1 of the MPU 201, and the flow of operation comes to a step 39. In a case where the timer IC 203 is not operating or if the time is not up as yet, a signal "0" is produced, and the flow proceeds to a step 2. At the step 2: A check is made for the state of the switch SW-R. If the switch SW-R is found to be in a on-state and a signal "0" is supplied to the input port int4, the flow comes to a step 27. If the switch SW-R is found to be in an off-state, the flow proceeds to a step 3.

Figure 4:
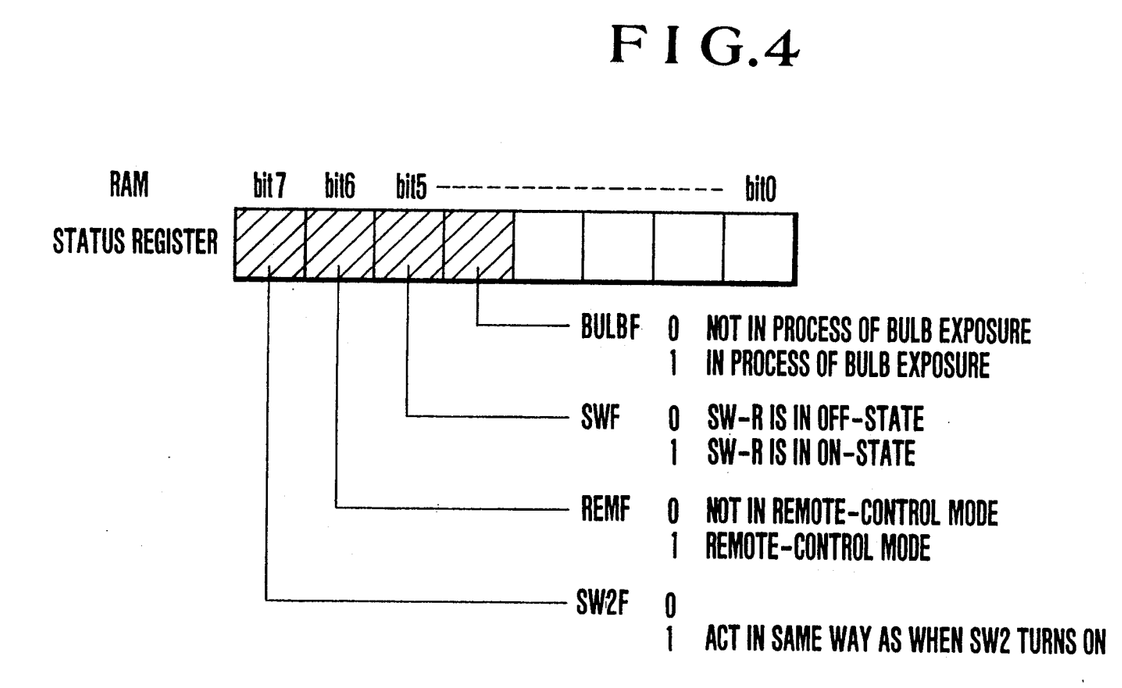
FIG. 4 shows RAM information arranged within a microcomputer which is included in the circuit of FIG. 2.

At the step 3: A flag SWF which is defined on a RAM as shown in FIG. 4 is cleared, and the flow proceeds to a step 4. This flag SWF is provided for finding if the switch SW-R has changed from an off-state to an on-state. At the step 4: A flag REMF which is defined on the RAM as shown in FIG. 4 is checked to find if the camera is in a remote-control mode. If the flag REMF is found to be at "1", the camera is considered to be in the remote-control mode, and the flow comes to a step 31. If the flag is found to be at "0", the flow proceeds to a step 5. At the step 5: The supply of power from the output port P0 of the MPU 201 to the remote-control signal receiving part 202 is stopped. A remote-control-signal-receiving inhibiting signal is sent out from the output port P1 to inhibit the part 202 from receiving any remote-control signal, and the flow proceeds to a step 6.

At the step 6: A timer stop signal is sent out from the output port P2 of the MPU 201 to the timer IC 203 to stop the timer from operating. This causes the timer IC 203 to supply its output "0" to the input port int1 of the MPU 201. At a step 7: A check is made for the state of the switch SW1. If the switch SW1 is found to be in an on-state, a signal "0" is supplied to the input port int2. The flow then comes to a step 12. If the switch SW1 is found to be in an off-state, a signal "1" is supplied to the input port int2, and the flow proceeds to a step 8. At the step 8: A check is made for reception of a remote-control signal at the remote-control signal receiving part 202. If the remote-control signal is found to have been received by the remote-control signal receiving part 202, a signal "1" is supplied to the input port int0 of the MPU 201. When the signal "1" is read by the MPU 201, the signal supplied from the remote-control signal receiving part 202 to the input port int0 changes to a signal "0". When the input signal received at the input port int0 is the signal "1", the MPU 201 considers that a remote-control signal has been received, and the flow comes to a step 34. If the input of the input port int0 is the signal "0", the flow proceeds to a step 9.

At the step 9: A check is made for the state of the switch SW1 in the same manner as at the step 7. If the switch SW1 is found to be in an on-state, the flow comes to a step 13. If it is found in an off-state, the flow proceeds to a step 10. At the step 10: A flag SW2F which is defined on the RAM as shown in FIG. 4 is checked. If the flag SW2F is found to be at "1", the flow comes to the step 13. If it is found to be at "0", the flow proceeds to a step 11. When the flag SW2F is at "1", the camera operates in the same manner as in a case where the switch SW2 is in an on-state. At the step 11: A flag BULBF which is defined on the RAM as shown in FIG. 4 is checked to find if the camera is in process of bulb exposure. If the flag BULBF is found to be at "1", the camera is considered to be in process of bulb exposure, and the flow comes to a step 21. If it is found to be at "0", the flow comes back to the standby state.

As described above, in cases where no change is found in any of the switches, no remote-control signal is received and the switch SW1 is in an off-state, the flow is executed in the sequence of steps 1, 2, 3, 4, 5, 6, 7, 8, 9, 10 and 11 and comes back to the standby state.

When the switch SW1 is pushed, the MPU 201 comes out of the standby state to execute the steps in the above-stated sequence before the flow branches from the step 7 to the step 12. At the step 12: The above-stated flag SW2F is cleared, and then the flow comes to the step 8. After that, the flow proceeds from the step 8 to the step 9. The flow branches from the step 9 to the step 13.

At the step 13: The above-stated flag BULBF is checked to find if the camera is in process of bulb exposure. If the flag BULBF is found to be at "1", the camera is considered to be in process of bulb exposure, and the flow comes back to the standby state. In a case where the flag BULBF is found to be at "0", the camera is considered not to be in process of bulb exposure, and the flow proceeds to a step 14. At the step 14: The light measuring circuit 204 which is shown in FIG. 2 is caused to measure light. The measured value of light is converted into a digital value. The digital measured value of light is supplied via an input port P3 to the MPU 201. Then, an aperture value and a shutter time value are obtained by a known programmed computing operation on the basis of the measured light value. After the computation, the flow proceeds to a step 15. At the step 15: A check is made for the state of the switch SW2. If the switch SW2 is in an on-state, the input port int3 receives a signal "0", and the flow comes to a step 17. If the switch SW2 is in an off state, the input port int3 receives a signal "1", and the flow proceeds to a step 16.

At the step 16: The above-stated flag REMF is checked. If the flag REMF is at "1", the flow proceeds to a step 17. If the flag REMF is at "0", the flow comes back to the standby state. At the step 17: Information on the aperture value obtained at the step 14 is supplied to the aperture control part 205. The aperture of the lens of the camera is controlled accordingly. At a step 18: A high-level signal is output from an output port P5 of the MPU 201 to the transistor TR1 to energize the magnet MG1 through the transistor TR1. The magnet MG1 then allows the leading shutter curtain to travel. The flow proceeds to a step 19. At the step 19: The switch SW-B is checked for the bulb exposure mode. If the switch SW-B is found to be in an on-state, a signal "0" is supplied to the input port int5. The camera is then considered to be in the bulb exposure mode, and the flow comes to a step 26. If the switch is found to be in an off-state, the camera is considered not to be in the bulb exposure mode, and the flow proceeds to a step 20.

At the step 20: The remote-control signal receiving part 202 is inhibited from receiving any remote-control signal. The flow proceeds to a step 21. At the step 21: A high-level signal is output from an output port P6 to energize the magnet MG2 through the transistor TR2. The magnet MG2 then allows the trailing shutter curtain to travel. The flow then proceeds to a step 22.

At the step 22: The flag SW2F is cleared, and the flow proceeds to a step 23. At the step 23: Shutter-charging and film-winding actions are performed in a known manner. The flow then comes to a step 24. At the step 24: The aperture control part 204 is caused to bring the aperture back to its full open position. After that, the flow proceeds to a step 25. At the step 25: The flag REMF is checked to find if the camera is in the remote-control mode. If the flag REMF is found to be at "1", the flow comes to a step 36. If the flag REMF is found to be at "0", the flow comes back to the standby state.

In cases where the camera is neither in the remote-control mode nor in the bulb exposure mode, a normal shooting operation is terminated. If the bulb exposure mode is selected and the switch SW2 is pushed, the flow of operation branches from the step 19 among the above-stated photographing sequence of steps to a step 26. At the step 26: The flag BULBF is set, and the flow comes back to the standby state. The bulb exposure which is effected with the camera not in the remote-control mode is terminated by turning the switch SW1 off. With the switch SW1 turned off, the MPU 201 is caused through the input port int2 to come out of the standby state. The flow then branches from the step 11 to the step 21 to allow the trailing shutter curtain to travel. This terminates the exposure.

In the remote-control mode, the normal shooting operation is performed in the following manner: When the switch SW-R is pushed, the input of the input port int4 brings the MPU 201 out of the standby state, and the flow of operation branches from the step 2 to a step 27. At the step 27: A check is made for the state of the flag SWF. The flow comes to the step 4 if the flag SWF is at "1". If the flag SWF is found to be at "0", the switch SW-R is considered to have been turned on, and the flow proceeds to a step 28. At the step 28: The flag SWF is set, and the flow proceeds to a step 29. At the step 29: The flag REMF is checked. The flow comes to a step 41 if the flag REMF is at "1" or proceeds to a step 30 if the flag REMF is at "0". At the step 30: The flag REMF is set at "1". The flow then comes to the step 4.

The flow branches from the step 4 to a step 31 as the flag REMF is set in this instance. At the step 31: The power is supplied from the output port P0 of the MPU 201 to the remote-control signal receiving part 202. A signal which permits reception of a remote-control signal is supplied from the output port P1. The flow then proceeds to a step 32.

Step 32: The timer IC 203 is checked to find if it is in operation. If so, the flow comes to the step 7. If not, the flow comes to a step 33. At the step 33: A counted value corresponding, for example, to five minutes is sent to the timer IC 203 to actuate the timer.

The camera is thus set to be in a remote-control-signal receivable state during the period of the remote-control mode. When the remote-control signal receiving part 202 receives a remote-control signal, the flow of operation branches from the step 8 to a step 34. At the step 34: The flag BULBF is checked to find if the camera is in process of bulb exposure. If the flag BULBF is found to be at "1", the flow comes to a step 38. If the flag BULBF is at "0", the flow proceeds to a step 35. At the step 35: The above-stated flag SW2F is set.

After this, the flow proceeds to the sequence of steps 9, 10, 13, 14, 15, 16, 17, 18, 19, 20, ..., 25 and 36 for shooting under the remote-control. Step 36: Reception of a remote-control signal is allowed in the same manner as at the step 31, and then the flow proceeds to a step 37. At the step 37: The timer IC 203 is actuated like at the step 33, and the flow comes back to the standby state. With the shooting thus made in accordance with a remote-control signal, the content of the remote-control timer is renewed every time the shutter is released.

Next, a bulb exposure under the remote control is performed as follows: When receiving a remote-control signal, the MPU 201 is caused through the input port int0 to come out of the standby state. Then, the flow of operation is executed in the sequence of steps 1, ..., 8, 34, 35, 9, 10, 13, 14, 15, 16, ..., 19 and 26 and then comes back to the standby state. At this time, the remote-control signal receiving part 202 is in a remote-control signal receivable state.

The state of bulb exposure is cancelled in the following manner: When a remote-control signal is received during a bulb exposure, the MPU 201 is brought out of the standby state through its input port int0. Then, the flow of operation is executed in the sequence of steps 1, 2, 3, ..., 8, 34 and 38. At the step 38: The flag SW2F is cleared. The flow then comes to the step 9. The flow comes to execute a next sequence of steps 9, 10, 11, 21, ... and 37. At the step 37, the exposure is terminated, and the flow comes back to the standby state.

It is also possible to cancel the bulb exposure state by means of the switch SW1. When the switch SW1 is pushed during the process of bulb exposure, the MPU 201 is caused through the input port int2 to come out of the standby state. The flow of operation is then executed in the sequence of steps 1, 2, ..., 7, 12, 8, 9 and 13. The flow then comes back to the standby state. Next, when the switch SW1 is turned off, the MPU 201 likewise comes out of the standby state to execute the flow of operation in the sequence of steps 1, 2, ..., 7, 8, 9, 10, 11, 21, ... and 37. At the step 37, the exposure is terminated, and the flow comes back to the standby state.

The remote-control mode is cancelled in the following manner: With the MPU 201 in the remote-control mode, when the counted value of the timer IC 203 reaches zero, the timer IC 203 supplies its output "1" to the output port int1 of the MPU 201. This brings MPU 201 out of the standby state, and the flow of its operation proceeds from the step 1 to a step 39.

At the step 39: The flag BULBF is checked to find if the camera is in process of bulb exposure. If the flag BULBF is found to be at "1", thus indicating that the camera is in process of bulb exposure, the flow proceeds to the step 2. If the flag BULBF is found to be at "0", the flow comes to a step 40. At the step 40: The flag REMF is cleared, and the flow comes to the step 2. Next, the flow of operation proceeds in the sequence of steps 2, 3, 4, 5, . . . and 11. The flow then comes back to the standby state. If the switch SW-R is pushed in the remote-control mode, the MPU 201 comes out of the standby state to perform the flow of operation in the sequence of steps 1, 2, 27, 28, 29 and 41. At the step 41: The flag REMF is cleared to "0", and the flow comes to the step 4. Then, the flow proceeds in the sequence of steps 4, 5, . . . and 11 and then comes back to the standby state.

Figure 5:
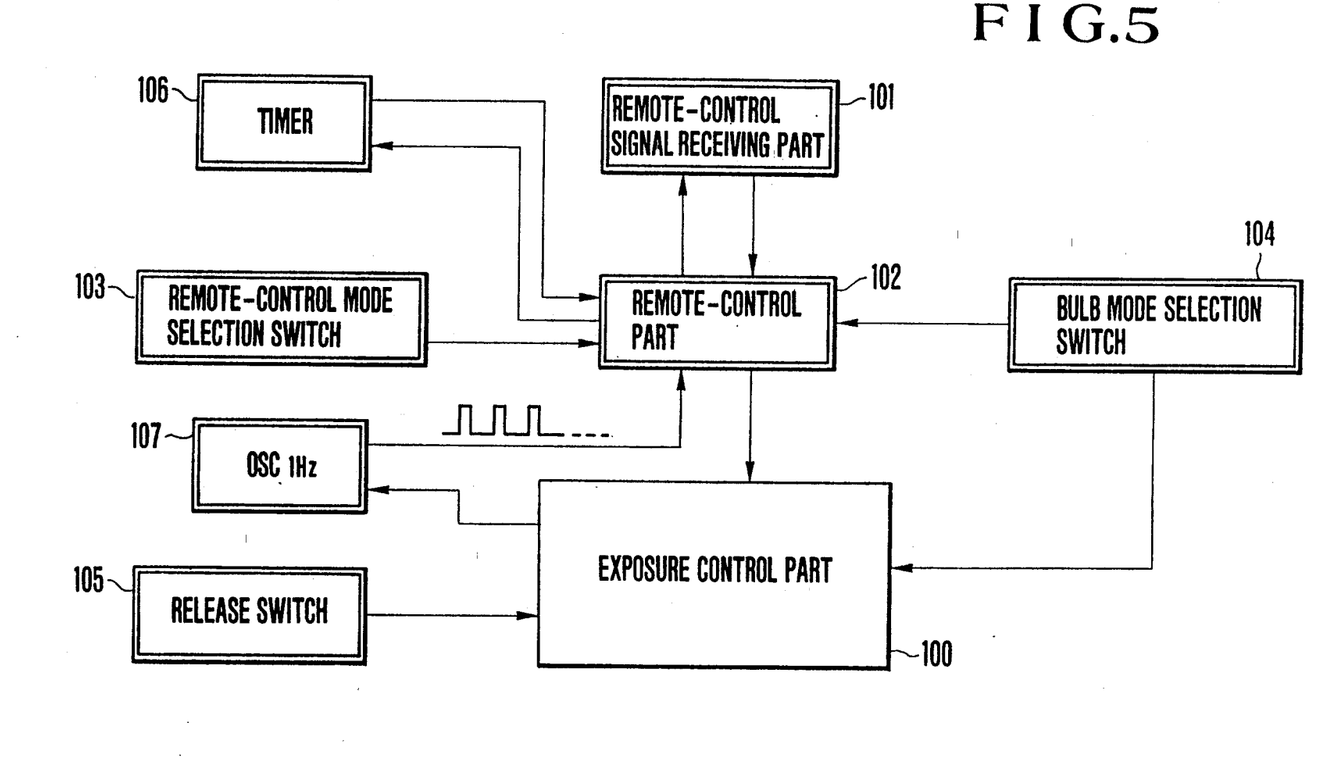
FIG. 5 is a block diagram showing the functions of a camera which is arranged as a second embodiment of the invention.

FIG. 5 shows in a block diagram the functions of a camera which is arranged according to this invention as a second embodiment thereof. The parts 100 to 105 of FIG. 5 are identical with those of the first embodiment shown in FIG. 1. A part 107 denotes an oscillator which is arranged to send a pulse signal to the remote-control part 102 every second, for example, during a bulb exposure.

Figure 6:
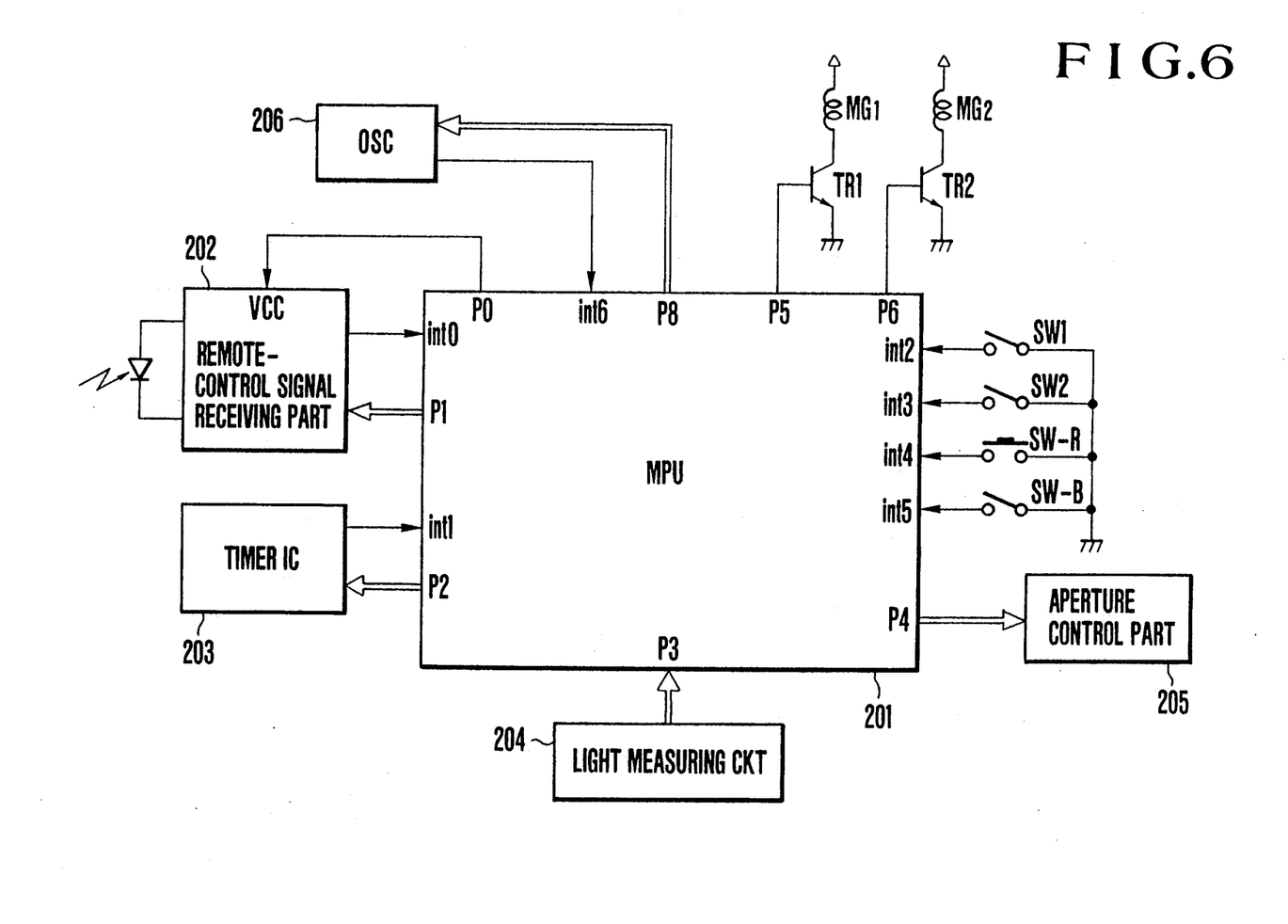
FIG. 6 is a circuit diagram showing the circuit arrangement of the camera of the second embodiment.

FIG. 6 shows the circuit arrangement of the second embodiment of the invention. The circuit arrangement includes an oscillator 206 which generates a clock signal in a cycle of 1 Hz. During a bulb exposure under the remote control, the clock signal is supplied to the MPU 201 under the control of an output port P8 of the MPU 201.

With the exception of the above-stated part, all other parts of the circuit arrangement of the second embodiment are identical with those of the first embodiment. Therefore, they are indicated by the same reference numerals as in the case of the first embodiment, and the details of them are omitted from the following description.

The MPU 201 is arranged to come out of its standby state to begin its processing operation when the state of an input port int6 is changed by a pulse input which comes from the oscillator 206 (hereinafter referred to as OSC) while the MPU 201 is in the standby state, or when the state of the input port int0 is changed by a remote-control signal received, or when the state of the input port int1 is changed by arrival of the counted value of the timer IC 203 at zero, or when the state of any of the input ports int2 to int5 is changed by the respective one of the switches SW1, SW2, SW-R and SW-B.

Figure 7:
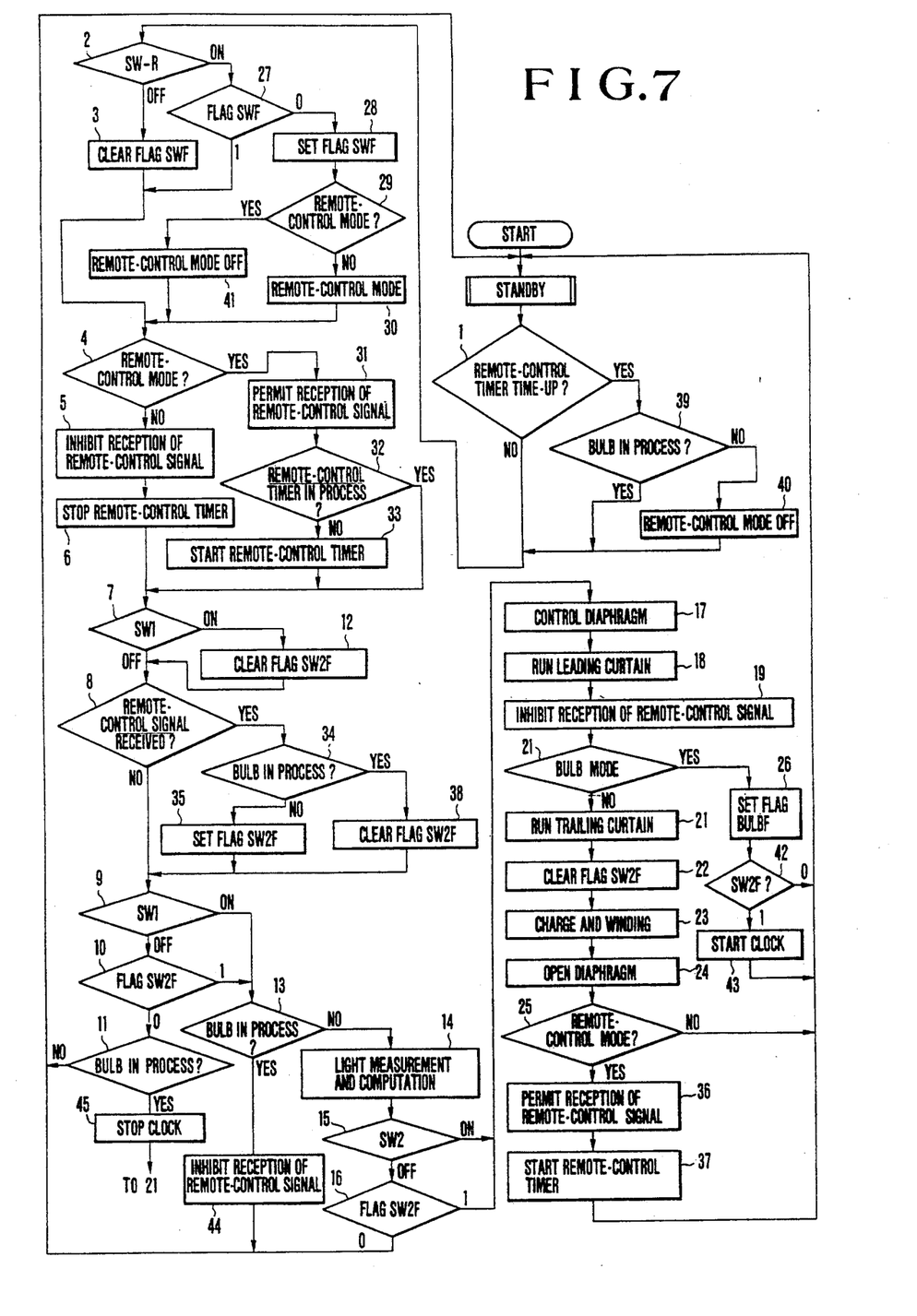
FIG. 7 is a flow chart showing the operation of the circuit shown in FIG. 6.

Next, the operation of the circuit shown in FIG. 6 is described with reference to FIG. 7 which is a flow chart. The ordinary shutter release operation of the camera is the same as in the first embodiment. Therefore, the following description covers only the operation to be performed for a bulb exposure under the remote control:

When a remote-control signal is received under such conditions that a remote-control signal is receivable (the remote-control mode), the camera is in the bulb exposure mode and the MPU 201 is in a standby state, the state of the input port int0 changes to bring the MPU 201 out of the standby state. The MPU 201 then begins to perform its processing operation from a step 1. The flow of operation proceeds in the sequence of steps 1, 2, 3, 4, 31, 32, 7, 8, 34, 35, 9, 10, 13, 14, 15, 16, 17, 18 and 19 in the same manner as described in the foregoing.

At the step 19: Reception of a remote-control signal is inhibited in the same manner as at the step 5. The flow then proceeds to a step 20. At the step 20: The switch SW-B is checked to find if the camera is in the bulb exposure mode. Since the camera is assumed to be in the bulb exposure mode in this instance, the flow of operation of the MPU 201 comes to a step 26. At the step 26: The flag BULBF is set, and the flow comes to a step 42.

Step 42: The flag SW2F is checked to make a discrimination between a bulb exposure under the remote control and a bulb exposure by means of the switch SW2. Since the camera is assumed to have the bulb exposure under the remote control in this instance, the flow proceeds to a step 43. At the step 43: The OSC 206 which is arranged to supply a pulse to the input port int6 of the MPU 201 every second is rendered operative, and the flow comes back to the standby state.

After this, the pulses generated by the OSC 206 brings the MPU 201 out of the standby state at intervals of one second to cause it to make a check for reception of a remote-control signal. If no remote-control signal is received, the flow of operation is executed in the sequence of steps 1, 2, 3, 4, 31, 32, 7, 8, 9, 10, 13 and 44.

Step 44: The remote-control signal receiving part 202 which has been set in a state of being enabled to receive the remote-control signal is again set in a state of being inhibited from receiving the remote-control signal. The flow then comes back to the standby state.

If no remote-control signal is received, the MPU 201 is caused by the OSC 206 to repeat the above-stated process at intervals of one second.

If a remote-control signal is received when the MPU 201 is brought out of the standby state by the pulse of the OSC 206, the flow of operation is executed in the sequence of steps 1, 2, 3, 4, 31, 32, 7, 8, 34, 38, 9, 10, 11, and 45. At the step 45: The OSC 206 is stopped from operating, and the flow comes to the step 21. The flow proceeds to the sequence of steps 21, 22, 23, 24, 25, 36 and 37 and then comes back to the standby state.

As described in the foregoing, the arrangement of the first and second embodiments of this invention enables the camera to permit a bulb exposure by the remote control without recourse to the use of any cable, so that the bulb exposure can be remotely carried out at such a distance that is beyond the reach of a cable.

It is an advantage of the embodiment that reception of the remote-control signal is inhibited during the process of an exposure other than a remotely controlled bulb exposure, so that the camera can be effectively prevented from performing any faulty action.

Further, in the case of a camera arranged to permit remote-control shooting and to prolong the service life of its power source by inhibiting reception of any remote-control signal after the lapse of a given period of time by means of a timer, the invented arrangement enables the camera to make a long exposure under the remote control such as a remotely controlled bulb exposure by keeping the camera in a state of being capable of receiving a remote-control signal even after the lapse of the given period of time defined by the timer.

Further, in the case of the second embodiment described, the battery power of the camera is effectively saved by the arrangement of making a check for a remote-control signal by actuating the remote-control signal receiving part at intervals of a given period of time during a bulb exposure.

What is claimed is:

1. A camera comprising:
 a) exposure means for performing an exposure action;

b) signal receiving means for receiving a remote-control signal; and c) control means for making a bulb exposure by causing said exposure means to begin the exposure action in response to reception of the remote-control signal by said signal receiving means and by causing said exposure means to terminate the exposure action in response to subsequent reception of the remote-control signal by said signal receiving means.

2. A camera according to claim 1, wherein said control means includes means for terminating the exposure action of said exposure means in response to a release operation performed on the side of the camera during said bulb exposure.

3. A camera according to claim 1, wherein said control means includes means for causing said exposure means to begin the exposure action in response to reception of the remote-control signal by said signal receiving means and for causing said exposure means to terminate the exposure action in response to the next reception of the remote-control signal by said signal receiving means.

4. A camera according to claim 1, further comprising bulb exposure mode setting means for setting a bulb exposure mode, and wherein said control means includes means for allowing, in response to setting of the bulb exposure mode by said bulb exposure mode setting means, the bulb exposure to be made by using the remote-control signal.

5. A camera according to claim 4, wherein said control means includes means for causing, when said bulb exposure mode setting means does not set the bulb exposure mode, said exposure means not to terminate the exposure action in response to reception of the remote-control signal by said signal receiving means.

6. A camera according to claim 1, further comprising second bulb exposure mode setting means for setting a second bulb exposure mode for causing said exposure means to begin and terminate the exposure action in response to a release operation performed on the side of the camera, and wherein said control means includes means for causing, when said second bulb exposure mode setting means sets said second bulb exposure mode, the bulb exposure not to be made by using the remote-control signal.

7. A camera according to claim 1, further comprising timer means for bringing said signal receiving means into a signal-receivable state for a predetermined period of time.

8. A camera according to claim 7, further comprising signal-receivable state maintaining means for maintaining the signal-receivable state of said signal receiving means in preference to said timer means in response to beginning of the bulb exposure by said control means.

9. A camera according to claim 1, further comprising timer means for bringing said signal receiving means into a signal-receivable state at intervals of a predetermined period of time.

10. A remote-control device of a camera, comprising:

a) signal receiving means for receiving a remote-control signal;

b) control means for controlling a bulb exposure by ordering an exposure action to be begun in response to reception of the remote-control signal by said signal receiving means and by ordering the exposure action to be terminated in response to subsequent reception of the remote-control signal by said signal receiving means.

11. A device according to claim 10, wherein said control means includes means for ordering the exposure action to be terminated in response to a release operation performed on the side of the camera during said bulb exposure.

12. A device according to claim 10, wherein said control means includes means for ordering the exposure action to be begun in response to reception of the remote-control signal by said signal receiving means and for ordering the exposure action to be terminated in response to the next reception of the remote-control signal by said signal receiving means.

13. A device according to claim 10, further comprising bulb exposure mode setting means for setting a bulb exposure mode, and wherein said control means includes means for ordering, in response to setting of the bulb exposure mode by said bulb exposure mode setting means, the bulb exposure to be made by using the remote-control signal.

14. A device according to claim 13, wherein said control means includes means for not ordering, when said bulb exposure mode setting means does not set the bulb exposure mode, the exposure action to be terminated in response to reception of the remote-control signal by said signal receiving means.

15. A device according to claim 10, further comprising second bulb exposure mode setting means for setting a second bulb exposure mode for ordering the exposure action to be begun and terminated in response to a release operation performed on the side of the camera, and wherein said control means includes means for not ordering, when said second bulb exposure mode setting means sets said second bulb exposure mode, the bulb exposure to be made by using the remote-control signal.

16. A device according to claim 10, further comprising timer means for bringing said signal receiving means into a signal-receivable state for a predetermined period of time.

17. A device according to claim 16, further comprising signal-receivable state maintaining means for maintaining the signal-receivable state of said signal receiving means in preference to said timer means in response to beginning of the bulb exposure by said control means.

18. A device according to claim 10, further comprising timer means for bringing said signal receiving means into a signal-receivable state at intervals of a predetermined period of time.

* * * * *